(12) United States Patent
Mihelich et al.

(10) Patent No.: US 10,164,846 B2
(45) Date of Patent: Dec. 25, 2018

(54) NETWORK FLOW ANALYSIS

(71) Applicant: Fortinet, Inc., Sunnyvale, CA (US)

(72) Inventors: Joseph R. Mihelich, Folsom, CA (US); Christian E. Navarrete, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 782 days.

(21) Appl. No.: 14/229,726

(22) Filed: Mar. 28, 2014

(65) Prior Publication Data

US 2015/0281007 A1   Oct. 1, 2015

(51) Int. Cl.
| G06F 15/173 | (2006.01) |
| H04L 12/26 | (2006.01) |
| H04L 29/06 | (2006.01) |
| H04L 12/721 | (2013.01) |
| H04L 12/745 | (2013.01) |

(52) U.S. Cl.
CPC .......... H04L 43/028 (2013.01); H04L 43/06 (2013.01); H04L 63/0421 (2013.01); H04L 43/026 (2013.01); H04L 45/66 (2013.01); H04L 45/748 (2013.01); H04L 63/0823 (2013.01)

(58) Field of Classification Search
CPC .......... H04L 43/028; H04L 63/0421; H04L 63/0823; H04L 45/748; H04L 45/66
See application file for complete search history.

(56) References Cited

U.S. PATENT DOCUMENTS

| 5,787,253 | A  * | 7/1998 | McCreery | H04L 29/06 370/351 |
| 7,680,890 | B1 * | 3/2010 | Lin | G06Q 10/107 706/900 |
| 2008/0101225 | A1* | 5/2008 | Tassinari | H04L 12/66 370/230 |
| 2011/0075568 | A1* | 3/2011 | Omar | H04L 43/10 370/242 |
| 2011/0213869 | A1* | 9/2011 | Korsunsky | G06F 21/55 709/223 |
| 2011/0231510 | A1* | 9/2011 | Korsunsky | G06F 21/55 709/213 |
| 2011/0238855 | A1* | 9/2011 | Korsunsky | G06F 21/55 709/231 |
| 2012/0227104 | A1* | 9/2012 | Sinha | H04L 12/585 726/22 |
| 2013/0254857 | A1* | 9/2013 | Bajenov | G06F 21/00 726/7 |
| 2013/0283041 | A1* | 10/2013 | Vajirkar | H04L 61/1511 713/156 |
| 2013/0339514 | A1* | 12/2013 | Crank | H04L 63/1408 709/224 |

(Continued)

*Primary Examiner* — Richard G Keehn
(74) *Attorney, Agent, or Firm* — Hamilton, DeSanctis & Cha LLP

(57) ABSTRACT

Systems and methods for a network flow analysis service that facilitates collection, analysis and sharing of information regarding network flows are provided. According to one embodiment, a network flow analysis service provider collects network traffic information of network flows from a plurality of different network sources, analyzes at least one attribute associating with the network flows based on the network traffic information; and distributes the at least one attribute to subscribers of the network flow analysis service.

40 Claims, 7 Drawing Sheets

(56) References Cited

U.S. PATENT DOCUMENTS

| | | | |
|---|---|---|---|
| 2014/0019758 A1* | 1/2014 | Phadke | H04N 21/2541 713/168 |
| 2014/0153513 A1* | 6/2014 | Lee | H04L 61/203 370/329 |
| 2014/0229407 A1* | 8/2014 | White | G06N 99/005 706/12 |
| 2014/0245423 A1* | 8/2014 | Lee | H04L 63/0218 726/12 |
| 2015/0180831 A1* | 6/2015 | Bowers | H04L 63/1408 726/1 |

* cited by examiner

NETWORK FLOW ANALYSIS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2014, Fortinet, Inc.

BACKGROUND

Field

Embodiments of the present invention generally relate to the field of network flow analysis techniques. In particular, various embodiments relate to methods and systems for performing online and/or offline analysis of network flows from different sources and distributing analysis reports to subscribers.

Description of the Related Art

Many Internet sites provide on-line applications or services, such as web services, file transfer protocol (FTP) services, online video streaming and online gaming. Users access to these online applications or services over the Internet create many kinds of network flows. These network flows have various Internet Protocol (IP) sources, IP destinations, protocols and ports. Network security devices that are managing the network flows may keep traffic logs and analyze who and what users have accessed various resources based on the network traffic logs. As traffic logs may contain sensitive information, network administrators usually do not share their traffic logs with others. Further, network flow analysis can be a computationally intensive task. When performed locally and on an individual basis, analysis of network flows is limited and slow. As such, not all network administrators or operators enable network flow analyzing in their network security devices. Therefore, there is a need for a solution that allows traffic data to be collected, aggregated, analyzed and shared with a community of network administrators.

SUMMARY

Systems and methods are described for a network flow analysis service that facilitates collection, analysis and sharing of information regarding network flows. According to one embodiment, a network flow analyzing system may collect network traffic information of network flows from a plurality of different network sources, analyzes attributes associating with the network flows based on the network traffic information; and distributes reports on attributes of network flows to subscribers of the network flow analysis service.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
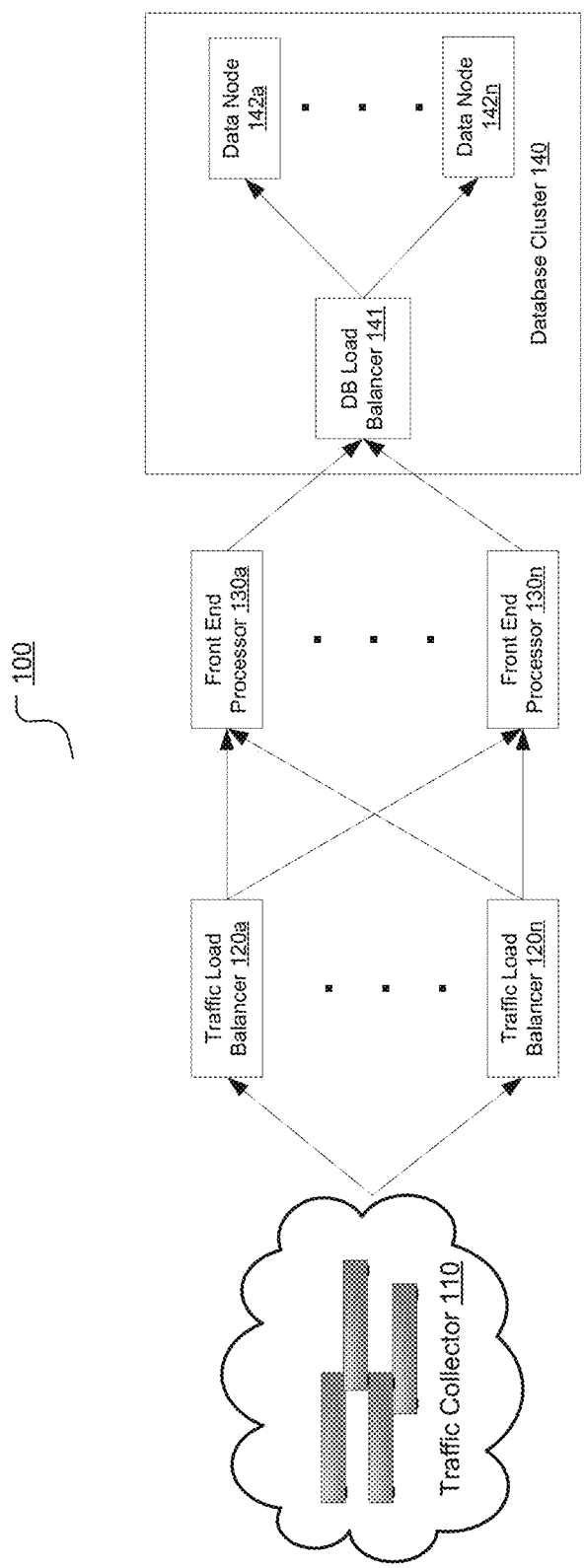
FIG. 1 is a block diagram conceptually illustrating a network flow analyzing system in accordance with an embodiment of the present invention.

Systems and methods are described for a network flow analysis service that facilitates collection, analysis and sharing of information regarding network flows. According to one embodiment, a network flow analyzing system may collect network traffic information of network flows from a plurality of different network sources, analyzes attributes associating with the network flows based on the network traffic information. The attributes associating with the network flows may be distributed subscribers of the network flow analysis service so that the subscribers may apply the attributes in their own network analyses.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

TERMINOLOGY

Brief definitions of terms used throughout this application are given below.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The phase "network security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping— that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

FIG. 1 is a block diagram conceptually illustrating a network flow analyzing system 100 in accordance with an embodiment of the present invention. In the context of the present example, network flow analyzing system 100 comprises a traffic collector 110, traffic load balancers 120a-n, front end processors 130a-n and a database cluster 140. Database cluster 140 further comprises a database load balancer 141 and data nodes 142a-n.

In one embodiment, traffic collector 110 receives traffic logs or network traffic information associated with network flows sent by different network sources (e.g., other network flow analyzing systems associated with third-party networks or other geographic locations of the enterprise network with which the traffic collector 110 is associated). Traffic collector 110 may be a network interface of network flow analyzing system 100 or a network traffic logging system, which will be described in further detail below with reference to FIG. 2.

In another embodiment, traffic collector 110 may collect network traffic information from a cloud-based traffic log. Network security devices of different network sources may have the function of storing traffic logs in a cloud-based traffic log service, such as the FortiCloud service available from Fortinet, Inc. Users of the cloud-based traffic logs may allow traffic collector 110 to access a portion of their cloud-based traffic logs, such as IP destinations, IP protocols and IP ports. In the following description, the combination of an IP destination, an IP protocol and an IP port of a network flow will be referred to as a 3-tuple.

In order to analyze attributes of a network flow, in addition to the 3-tuple, some portions of payload data associated with the network flow may also be allowed to be accessed by traffic collector 110 so that more detailed attributes can be determined by a deep packet inspection. For example, traffic collector 110 may be allowed to access a total of 256 bytes of the payload of the network flow. In one embodiment, if only client traffic of a session is to be analyzed, all 256 bytes are allocated to the client traffic. If both client traffic and server traffic of the session are to be inspected, then 128 bytes may be allocated to each of them.

In a further embodiment, administrators of networks may have already analyzed the network flows based on their own traffic logs before uploading the traffic logs. Therefore, traffic collector 110 may collect traffic logs together with initial analyses of network flow data from the different network sources. These initial analyses may include attributes of network flows, such as owners of IP destinations, applications of network flows, application categories of network flows and security categories of network flows. These initial analyses may be uploaded to traffic collector 110 or saved on a cloud-based log which the traffic collector 110 may have limited right to access the initial analyses.

Figure 2:
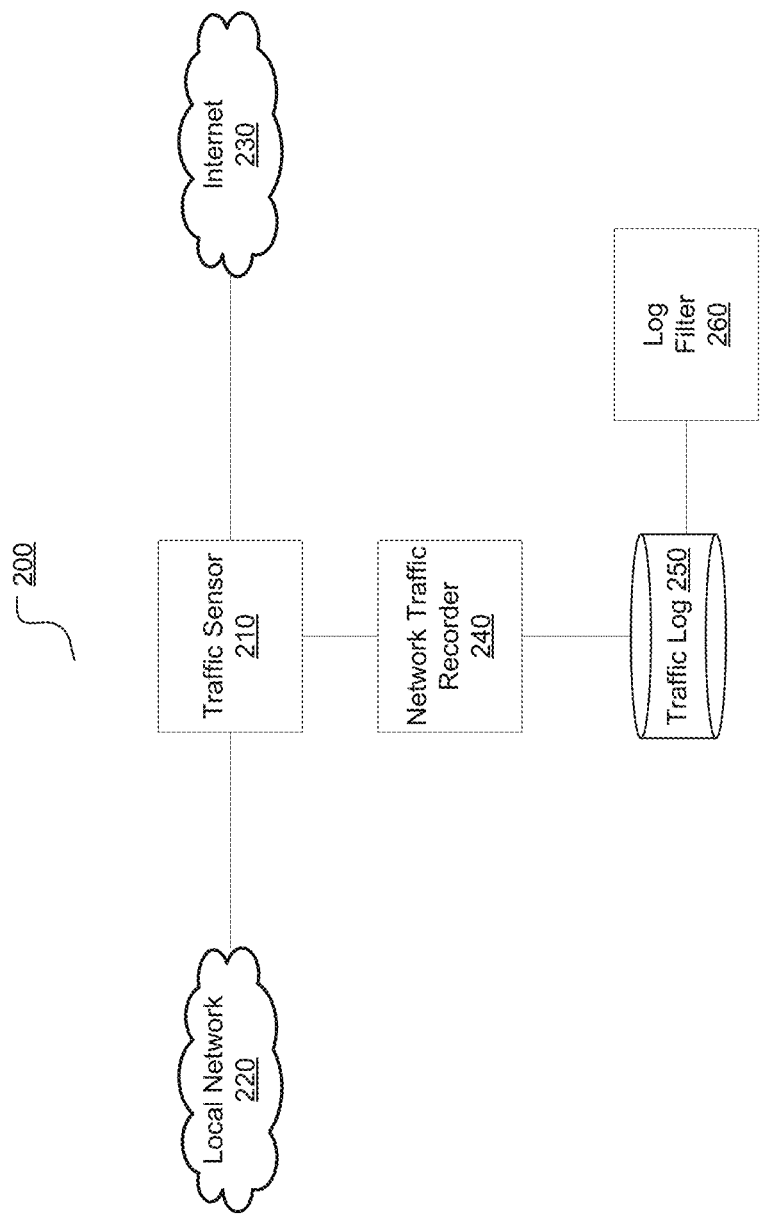
FIG. 2 is a block diagram conceptually illustrating a network traffic logging system in accordance with an embodiment of the present invention.

FIG. 2 is a block diagram conceptually illustrating a network traffic logging system 200 in accordance with an embodiment of the present invention. The network traffic logging system may comprise traffic sensor 210 which is connected to local network 220 and the Internet 230. Traffic sensor 210 makes copies of packets of network flows that go through it. Traffic sensor 210 may be a GIGAMON traffic sensor or a FORTIGATE firewall. The copies of packets may be sent to network traffic recorder 240 which stores the copies of packets to traffic log 250. In one embodiment, the raw data in traffic log 250 may be sent to traffic collector 110 in real time or periodically.

In one embodiment, network traffic logging system 200 may further comprise log filter 260. Log filter 260 may be used to filter network traffic logs so that only IP destinations, IP protocols and IP ports of sessions or only some bytes of each sessions may be recorded or sent to traffic collector 110 based on security policies of network traffic logging system 200.

Further, a traffic log may be preprocessed according to its UTM classification. Attributes of network flows, such as IP destination owners, application identifications, application categories, virus detections, may be classified based on traffic logs by network traffic logging system 200. These classifications may be uploaded or accessed by traffic collector 110 as initial analyses of attributes of network flows.

Returning briefly to FIG. 1, after traffic collector 110 receives network traffic information from different network sources, this data may be sent to one or more traffic load balancers 120a-n. It is to be understood that the input traffic load may be more than any single server can handle. As such, network flow analyzing system 100 may optionally include one or more traffic load balancers 120a-n so that traffic load may be spread to multiple servers.

In the context of the current example, network flow analyzing system 100 may include one or more front end processors 130a-n. Traffic logs collected from different sources may contain different contents. For example, some traffic logs may contain only 3-tuple information while others may contain 3-tuple information together with partial payload data associated with network flows. Some traffic logs may even contain packets of network flows. Further, traffic logs from different sources may have different formats. For example, different users of a cloud-based traffic logging service may create tables for their network logs in different formats. The traffic logs uploaded from different sources may also have different formats. Therefore, front end processors 130a-n may be configured to identify and extract a subset of available data that is useful for analyzing the attributes of network flows. In one embodiment, front end processors 130a-n may extract 3-tuple information for use in connection with further analyzing raw data associated with traffic logs. In another embodiment, front end processors 130a-n may further filter out local IP traffic from the traffic logs because the local IP traffic usually does not need to be analyzed by network flow analyzing system 100. Front end processors 130a-n may further anonymize traffic logs by removing the source information from the traffic log so that network flow analyzing system 100 can only analyze IP destinations and share IP destination related attributes and reports with other subscribers without disclosing sources of network flows.

After raw traffic data is processed by front end processors 130a-n, traffic data that are useful for traffic analysis may be sent to database cluster 140. As the traffic data may be more than any single data node can handle, database cluster 140 may optionally include database load balancer 141 so that traffic data may be spread to multiple data nodes 142a-n. Although only one database load balancer 141 is shown in FIG. 1, more database load balancers may be incorporated in database cluster 140 if desired or necessary in the context of the particular deployment scenario. The functions and structure of data nodes 142a-n are described further below with reference to FIG. 3.

Figure 3:
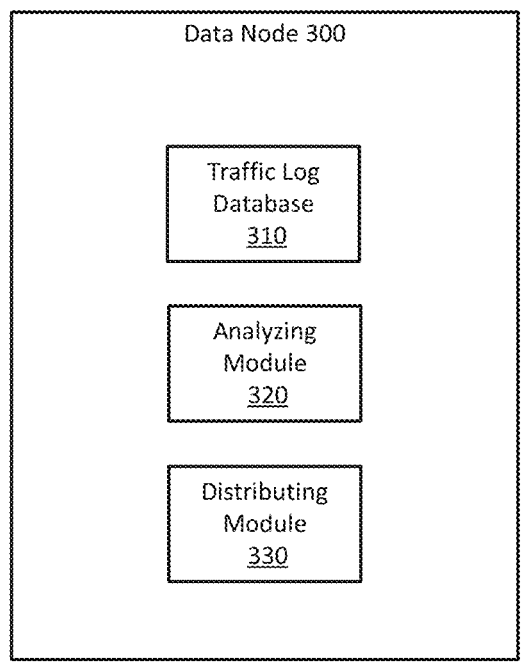
FIG. 3 is a block diagram conceptually illustrating a data node in accordance with an embodiment of the present invention.

FIG. 3 is a block diagram conceptually illustrating a data node 300 in accordance with an embodiment of the present invention. In the present example, data node 300 includes a traffic log database 310, an analyzing module 320 and a distributing module 330. In one embodiment, traffic log database 310 is configured for storing 3-tuple information associated with network flows that have been anonymized by front end processors. In other embodiment, traffic database 310 may store raw data, some portions of payloads and/or initial analyzing reports of network flows that are collected from different sources. Analyzing module 320 is used to analyze attributes associated with the network flows based on the collected traffic logs. The functions and structure of analyzing module 320 are described further below with reference to FIG. 4. Distributing module 330 is used for distributing reports on attributes of network flows to subscribers of the network flow analysis service.

Figure 4:
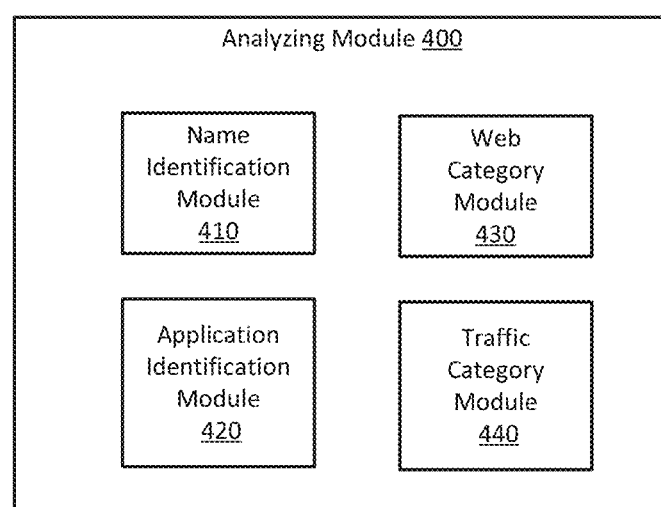
FIG. 4 is a block diagram conceptually illustrating an analyzing module in accordance with an embodiment of the present invention.

FIG. 4 is a block diagram conceptually illustrating an analyzing module 400 in accordance with an embodiment of the present invention. In the context of the example illustrated by FIG. 4, analyzing module 400 includes a name identification module 410, an application identification module 420, a web category module 430 and a traffic category module 440. Name identification module 410 is used for identifying an owner of an IP destination of a network flow. Application identification module 420 is used for identifying an application of a network flow. An example of application identification module 420 is described below with reference to FIG. 5. Web category module 430 is used for identifying a web category of an application. Traffic category module 440 is used for identifying a security category of a network flow. Although four blocks are shown in FIG. 4, it is to be understood that more blocks may be incorporated into the analyzing module 400 if more attributes of network flows are to be analyzed.

Name identification module 410 may use one or more Ruby scripts to collect name identification information and assign owners to target IP addresses. A set of Ruby scripts may be used for this objective.

According to one embodiment, first, a list of hosts is provided to the name identification module 410. In one embodiment, the list of hosts may be generated from the initial reports submitted to the network flow analyzing system. In another embodiment, the list of hosts may be a list of popular sites as collected and ranked by a global traffic ranking service. The list of hosts may have the following general form:

. . .
www.hp.com
app.yahoo.com
www.dell.co.uk
www.google.com
. . .

Figure 6:
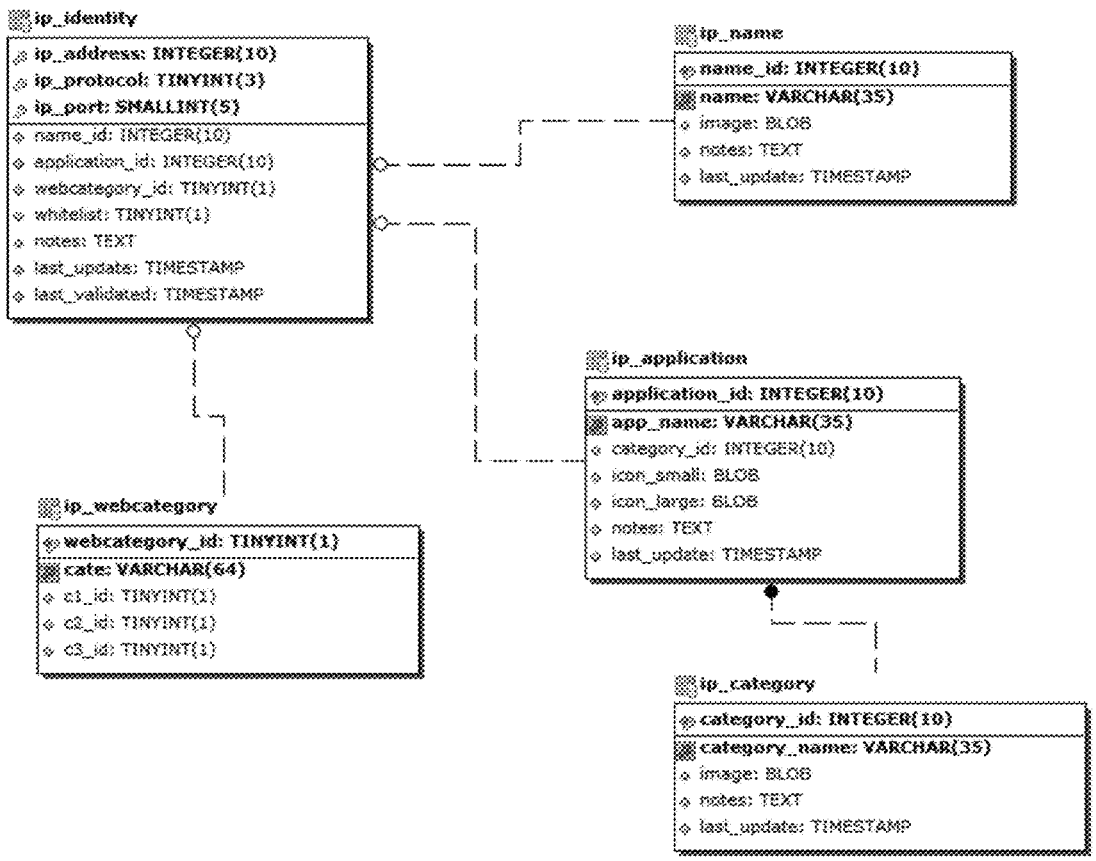
FIG. 6 illustrates data structure of a database in accordance with an embodiment of the present invention.

After receiving the list of hosts, a first Ruby script of name identification module 410 parses the list of hosts and parses all the domains of the hosts. The first Ruby script divides each host by their root domain (e.g., hp.com, yahoo.com, dell.co.uk, google.com) and performs a reverse lookup to get the IP address for each domain/host. If such IP address has a reverse lookup and the reverse lookup resolves to the domain, the domain is inserted in a database table as a company/organization that has their own netblock. Also, the first Ruby script may assign an identifier to each host to make a relationship between all the hosts and their domain (e.g., app.yahoo.com→yahoo.com). All the results may be stored in a database table (e.g., the ip_name database table) as shown in FIG. 6.

Next, a second Ruby script of name identification module 410 may be used for extracting from the database table the IP address that belongs to each domain and then performing a remote whois search. The second Ruby script may additionally parse the result of the whois search in order to extract the organization name and netblock of the organization. The second script can also make relationships between the organization names/netblocks collected previously and the target IP addresses. Once the second script is done, then at a database level there is a relation between domain, host, and organization name. The results of the foregoing may be stored within a database table (e.g., the ip_name database table) as shown in FIG. 6.

For purposes of illustration, the second Ruby script may retrieve the IP address "98.138.253.109" from the database table. Then, the second Ruby script may perform a lookup within the database to identify if the IP address "98.138.253.109" falls into a netblock for a registered company/organization. If it is found within the database, which means that 98.138.253.109 falls in the netblock 98.1.1.1-99.255.255.255, then the script may further identify that such netblock is owned by "Yahoo!, Inc.", assign this organization name for the URL that belongs to 98.138.253.109 which is yahoo.com and also update ALL the hosts that have *.yahoo.com as the domain name. If it is not found within the database table, then a remote whois request may be made in order to identify the organization name/netblock for such IP address. If an IP address does not exists within the database table, then a new record (organization name/netblock) may be inserted into the database table.

A third Ruby script of name identification module 410 may be used to receive a target IP address and assign an organization name to the target IP address. This script may update the name_id value of the table "ip_identify" of FIG. 6 for each IP address in which an organization name was identified.

For purposes of illustration, the third Ruby script may receive an IP address "98.30.30.30" from the table "ip_name" as shown in FIG. 6. Notice that this example IP address is owned by the Yahoo!. The reverse lookup of the IP address 98.30.30.30 is executed and the IP address is resolved to chat.yahoo.com. Then, a lookup on the ip_name table as shown in FIG. 6 is executed and it identifies that the domain "yahoo.com" exists in the ip_name table and the domain name has assigned an organization name "Yahoo!, Inc." At this point, the owner/organization name for 98.30.30.30 may be automatically updated to the identifier of "Yahoo!, Inc.". If the reverse lookup fails, then a local whois search will be executed and a lookup on the netblock table is performed to determine if the IP address falls into a stored netblock. Since Yahoo! has been identified before, the script will detect that 98.30.30.30 falls into the netblock for "Yahoo!, Inc.", and then the organization name for 98.30.30.30 is updated with "Yahoo!, Inc.". If the IP address is not found in the local table, a remote whois (Internet whois) search is executed, such as "whois 98.30.30.30". The third Ruby script may parse the whois response, and assign/store the new organization name and the respective netblock.

In some cases there is a 1-to-1 mapping between an IP address and a unique name. In others there is a many-to-one relationship between names and an IP address. In general, the desired name of an IP address is the company/organization that owns, uses and maintains the IP address. Take 3-tuple (8.8.8.8,UDP,53) of a network flow as an example. The whois lookup shows two entities, "Level 3 Communications, Inc" and "Google, Inc." as follows:

Level 3 Communications, Inc. LVLT-ORG-8-8 (NET-8-0-0-1) 8.0.0.0-8.255.255.255

Google Incorporated LVLT-GOOGL-1-8-8-8 (NET-8-8-8-0-1) 8.8.8.0-8.8.8.255

In this case "Google Inc" is the more specific mapping and a quick search confirms that the IP address is indeed used by Google Inc. The owner of IP address "8.8.8.8" is assigned to "Google Inc." rather than "Level 3 Communications, Inc".

In another embodiment, name identification module 410 may provide name identification (name_id) for a given 3-tuple with a high level of accuracy and quality in the resulting match. The name identification is obtained by performing a data match based on SSL security certificate (Organizational Unit and Common Name) data, PTR (DNS pointer record) data and Transmission Control Protocol (TCP) response data. The identification module 410 may comprise a script for each SSL based protocol to analyze the identification of an IP destination of the SSL based protocol. Exemplary Ruby scripts for analyzing the identification for SSL based protocols may include the following:

update_name_id_http.rb—Performs name identification through Hypertext Transfer Protocol (HTTP) protocol.

update_name_id_https.rb—Performs name identification through Hypertext Transfer Protocol Secure (HTTPS) protocol.

update_name_id_ftps.rb—Performs name identification through FTP Secure (FTPS) protocol.

update_name_id_imaps.rb—Performs name identification through Internet message access protocol secure (IMAPS) protocol.

update_name_id_ldaps.rb—Performs name identification through Lightweight Directory Access Protocol secure (LDAPS) protocol.

update_name_id_msft-gc-ssl.rb—Performs name identification through MSFT-GC-SSL protocol.

update_name_id_nntps.rb—Performs name identification through network news transfer protocol secure (NNTPS) protocol.

update_name_id_pop3s.rb—Performs name identification through POP3 secure (POP3S) protocol.

update_name_id_smtps.rb—Performs name identification through simple mail transfer protocol secure (SMTPS) protocol.

In the context of the present example, the above-listed Ruby scripts are named in ruby update_name_id_<protocol>.rb format. For purposes of illustration, examples of performing name identification through the hypertext transfer protocol (HTTP), hypertext transfer protocol secure (HTTPS) protocol, the FTPS protocol, the IMAPS protocol, the LDAPS protocol, Microsoft Global Catalog over SSL protocol, NNTPS protocol, POP3S protocol, SMTPS protocol and by performing PTR and DNS (NS, MX) queries are described below. As those of ordinary skill in the art will appreciate, performing name identification through other SSL-based protocols will be similar to these examples.

Example 1—Performing Name Identification Through HTTP

For analyzing the identification of IP destinations of "HTTP" protocol,

1. Run the script: ruby update_name_id_http.rb
2. The script performs a database (DB) query looking for all the IP addresses with name_id=0, ip_protocol=6 and ip_port=80. The step will extract HTTP records from the traffic log.
3. The script performs a first check using a 'openssl' linux command-line tool. The script takes as a target IP all the IP resulting addresses derived from the step #2 and starts the process for each one.
4. The 'openssl' linux command-line tool performs an SSL-connect action targeting TCP port 443 (HTTPS) against the target IP address. This specific check of performing a HTTPS request differs from the rest of checks since the destination port (80) obtained from the DB will not contain a certificate; however is not exempt of having the TCP port 443 opened and if such request is getting a valid response, the process continues; otherwise the next IP address will be processed and the regular IP processing will continue.
5. While setting up an SSL-connect with the IP destination, a certificate of the IP destination is received by the identification module. Usually, the certificate is issued to an organization by a certificate authority after the identification of the organization is verified. Therefore, in a case in which the owner of the certificate is the owner of the IP address, the organization name included in the certificate will accurately identify the owner of the IP destination.
6. The script parses out the Organizational Unit (O=) and Common Name (CN=) and stores both data in memory.
7. The script executes a DB query looking for the data contained inside of the "O=" field in the ip_name table as shown in FIG. 6. If it is already exists, then no new record for such organization will be inserted in the DB, otherwise it is inserted in the ip_name table as a new organization. Although the organization name of a certificate may be an accurate identification of an IP destination, in one embodiment it is desirable to perform a further check to verify the identification by the following optional steps.
8. The script does a second check by performing a PTR lookup on the target IP address using the linux 'dig' tool in order to get the corresponding linked domain(s) and such data is stored in memory. The PTR record of DNS shows a canonical name of an IP address in a reverse DNS lookup.
9. The script does a third check (PTR simple check—first) which is about comparing the PTR CNAME against the data obtained from the Common Name (C=) value. The result for such match is a BOOLEAN value that will be stored in memory for later use.
10. The script does a fourth check (PTR simple check—second) which is about comparing the domain name/hostname against the data obtained from the Common Name (C=) value. The result for such match is a BOOLEAN value that will be stored in memory for later use.
11. The script does a fifth check (PTR check) using the linux tool 'curl' which performs an HTTPS request on the target IP address/port and the HTTP response (HTTP Body and HTTP Header respectively) is inspected looking for any match for the PTR CNAME. The result for such match check is a BOOLEAN value that will be stored in memory for later use.
12. The script does a fifth check (CN check) using the linux tool 'curl' which performs an HTTPS request on the target IP address/port and the HTTP response (HTTP Body and HTTP Header respectively) is inspected looking for any match for the domain name/hostname. The result for such match check is a BOOLEAN value that will be stored in memory for later use.
13. Finally, a successful match condition will be when:
    Step #9 OR Step #10 AND Step #11 AND Step #12 are TRUE
    Step #11 AND Step #12 are TRUE
    Step #12 is TRUE
14. A DB query is executed looking inside of the ip_name table for the name_id assigned to the organization extracted from the SSL certificate (O=) data, and then assigning the resulting organization name_id to the 3-tuple in the ip_identity table.

Example 2—Performing Name Identification Through HTTPS

For analyzing the identification of IP destinations of "HTTPS" protocol,

1. Run the script: ruby update_name_id_https.rb
2. The script performs a database (DB) query looking for all the IP addresses with name_id=0, ip_protocol=6 and ip_port=443. The step will extract HTTPS records from the traffic log.
3. The script performs a first check using a 'openssl' linux command-line tool. The script takes as a target IP all the IP resulting addresses derived from the step #2 and starts the process for each one.
4. The 'openssl' linux command-line tool performs an SSL-connect action targeting TCP port 443 (HTTPS) against the target IP address.
5. While setting up an SSL-connect with the IP destination, a certificate of the IP destination is received by the identification module. Usually, the certificate is issued to an organization by a certificate authority after the identification of the organization is verified. Therefore, in a case in which the owner of the certificate is the owner of the IP address, the organization name included in the certificate will accurately identify the owner of the IP destination.
6. The script parses out the Organizational Unit (O=) and Common Name (CN=) and stores both data in memory.
7. The script executes a DB query looking for the data contained inside of the "O=" field in the ip_name table as shown in FIG. 6. If it is already exists, then no new record for such organization will be inserted in the DB, otherwise it is inserted in the ip_name table as a new organization. Although the organization name of a certificate may be an accurate identification of an IP destination, in one embodiment it is desirable to perform a further check to verify the identification by the following optional steps.
8. The script does a second check by performing a PTR lookup on the target IP address using the linux 'dig' tool in order to get the corresponding linked domain(s) and such data is stored in memory. The PTR record of DNS shows a canonical name of an IP address in a reverse DNS lookup.
9. The script does a third check (PTR simple check—first) which is about comparing the PTR CNAME against the data obtained from the Common Name (C=) value. The result for such match is a BOOLEAN value that will be stored in memory for later use.
10. The script does a fourth check (PTR simple check—second) which is about comparing the domain name/hostname against the data obtained from the Common Name (C=) value. The result for such match is a BOOLEAN value that will be stored in memory for later use.
11. The script does a fifth check (PTR check) using the linux tool 'curl' which performs an HTTPS request on the target IP address/port and the HTTP response (HTTP Body and HTTP Header respectively) is inspected looking for any match for the PTR CNAME. The result for such match check is a BOOLEAN value that will be stored in memory for later use.
12. The script does a fifth check (CN check) using the linux tool 'curl' which performs an HTTPS request on the target IP address/port and the HTTP response (HTTP Body and HTTP Header respectively) is inspected looking for any match for the domain name/hostname. The result for such match check is a BOOLEAN value that will be stored in memory for later use.
13. Finally, a successful match condition will be when:
    Step #9 OR Step #10 AND Step #11 AND Step #12 are TRUE
    Step #11 AND Step #12 are TRUE
    Step #12 is TRUE
14. A DB query is executed looking inside of the ip_name table for the name_id assigned to the organization extracted from the SSL certificate (O=) data, and then assigning the resulting organization name_id to the 3-tuple in the ip_identity table.

Example 3—Performing Name Identification Through FTPS

For analyzing the identification of IP destinations of "FTPS" protocol:
1. Run the script: ruby update_name_id_ftps.rb
2. The script performs a database (DB) query looking for all the IP addresses with name_id=0, ip_protocol=6 and ip_port=990. The step will extract FTPS records from the traffic log.
3. The script performs a first check using a 'openssl' linux command-line tool. The script takes as a target IP all the IP resulting addresses derived from the step #2 and starts the process for each one.
4. The 'openssl' linux command-line tool performs an SSL-connect action targeting TCP port 990 (FTPS) against the target IP address and store the result in memory for later use.
5. While setting up an SSL-connect with the IP destination, a certificate of the IP destination is received by the identification module. Usually, the certificate is issued to an organization by a certificate authority after the identification of the organization is verified. Therefore, in a case in which the owner of the certificate is the owner of the IP address, the organization name included in the certificate will accurately identify the owner of the IP destination.
6. The script parses out the Organizational Unit (O=) and Common Name (CN=) and stores both data in memory.
7. The script executes a DB query looking for the data contained inside of the "O=" field in the ip_name table as shown in FIG. 6. If it is already exists, then no new record for such organization will be inserted in the DB, otherwise it is inserted in the ip_name table as a new organization. Although the organization name of a certificate may be an accurate identification of an IP destination, in one embodiment it is desirable to perform a further check to verify the identification by the following optional steps.
8. The script does a second check by performing a PTR lookup on the target IP address using the linux 'dig' tool in order to get the corresponding linked domain(s) and such data is stored in memory. The PTR record of DNS shows a canonical name of an IP address in a reverse DNS lookup.
9. The script does a third check (PTR simple check—first) which is about comparing the PTR CNAME against the data obtained from the Common Name (C=) value. The result for such match is a BOOLEAN value that will be stored in memory for later use.
10. The script does a fourth check (PTR simple check—second) which is about comparing the domain name/hostname against the data obtained from the Common Name (C=) value. The result for such match is a BOOLEAN value that will be stored in memory for later use.
11. The script does a fifth check (PTR check) using the data stored from step #4 which is inspected looking for any match for the PTR CNAME. The result for such match check is a BOOLEAN value that will be stored in memory for later use.
12. The script does a fifth check (CN check) using the data stored from step #4 which is inspected looking for any match for the domain name/hostname. The result for such match check is a BOOLEAN value that will be stored in memory for later use.
13. Finally, a successful match condition will be when:
Step #9 OR Step #10 AND Step #11 AND Step #12 are TRUE
Step #11 AND Step #12 are TRUE
Step #12 is TRUE
14. A DB query is executed looking inside of the ip_name table for the name_id assigned to the organization extracted from the SSL certificate (O=) data, and then assigning the resulting organization name_id to the 3-tuple in the ip_identity table.

Example 4—Performing Name Identification Through IMAPS

For analyzing the identification of IP destinations of "IMAPS" protocol:
1. Run the script: ruby update_name_id_imaps.rb
2. The script performs a database (DB) query looking for all the IP addresses with name_id=0, ip_protocol=6 and ip_port=993. The step will extract IMAPS records from the traffic log.
3. The script performs a first check using a 'openssl' linux command-line tool. The script takes as a target IP all the IP resulting addresses derived from the step #2 and starts the process for each one.
4. The 'openssl' linux command-line tool performs an SSL-connect action targeting TCP port 993 (IMAPS) against the target IP address and store the result in memory for later use.
5. While setting up an SSL-connect with the IP destination, a certificate of the IP destination is received by the identification module. Usually, the certificate is issued to an organization by a certificate authority after the identification of the organization is verified. Therefore, in a case in which the owner of the certificate is the owner of the IP address, the organization name included in the certificate will accurately identify the owner of the IP destination.
6. The script parses out the Organizational Unit (O=) and Common Name (CN=) and stores both data in memory.
7. The script executes a DB query looking for the data contained inside of the "O=" field in the ip_name table as shown in FIG. 6. If it is already exists, then no new record for such organization will be inserted in the DB, otherwise it is inserted in the ip_name table as a new organization. Although the organization name of a certificate may be an accurate identification of an IP destination, in one embodiment it is desirable to perform a further check to verify the identification by the following optional steps.
8. The script does a second check by performing a PTR lookup on the target IP address using the linux 'dig' tool in order to get the corresponding linked domain(s) and such data is stored in memory. The PTR record of DNS shows a canonical name of an IP address in a reverse DNS lookup.
9. The script does a third check (PTR simple check—first) which is about comparing the PTR CNAME against the data obtained from the Common Name (C=) value. The result for such match is a BOOLEAN value that will be stored in memory for later use.
10. The script does a fourth check (PTR simple check—second) which is about comparing the domain name/hostname against the data obtained from the Common Name (C=) value. The result for such match is a BOOLEAN value that will be stored in memory for later use.
11. The script does a fifth check (PTR check) using the data stored from step #4 which is inspected looking for any match for the PTR CNAME. The result for such match check is a BOOLEAN value that will be stored in memory for later use.
12. The script does a fifth check (CN check) using the data stored from step #4 which is inspected looking for any match for the domain name/hostname. The result for such match check is a BOOLEAN value that will be stored in memory for later use.
13. Finally, a successful match condition will be when:
Step #9 OR Step #10 AND Step #11 AND Step #12 are TRUE
Step #11 AND Step #12 are TRUE
Step #12 is TRUE
14. A DB query is executed looking inside of the ip_name table for the name_id assigned to the organization extracted from the SSL certificate (O=) data, and then assigning the resulting organization name_id to the 3-tuple in the ip_identity table.

Example 5—Performing Name Identification Through LDAPS

For analyzing the identification of IP destinations of "LDAPS" protocol:
1. Run the script: ruby update_name_id_ldaps.rb
2. The script performs a database (DB) query looking for all the IP addresses with name_id=0, ip_protocol=6 and ip_port=636. The step will extract LDAPS records from the traffic log.
3. The script performs a first check using a 'openssl' linux command-line tool. The script takes as a target IP all the IP resulting addresses derived from the step #2 and starts the process for each one.
4. The 'openssl' linux command-line tool performs an SSL-connect action targeting TCP port 636 (LDAPS) against the target IP address and store the result in memory for later use.
5. While setting up an SSL-connect with the IP destination, a certificate of the IP destination is received by the identification module. Usually, the certificate is issued to an organization by a certificate authority after the identification of the organization is verified. Therefore, in a case in which the owner of the certificate is the owner of the IP address, the organization name included in the certificate will accurately identify the owner of the IP destination.
6. The script parses out the Organizational Unit (O=) and Common Name (CN=) and stores both data in memory.
7. The script executes a DB query looking for the data contained inside of the "O=" field in the ip_name table as shown in FIG. 6. If it is already exists, then no new record for such organization will be inserted in the DB, otherwise it is inserted in the ip_name table as a new organization. Although the organization name of a certificate may be an accurate identification of an IP destination, in one embodiment it is desirable to perform a further check to verify the identification by the following optional steps.

8. The script does a second check by performing a PTR lookup on the target IP address using the linux 'dig' tool in order to get the corresponding linked domain(s) and such data is stored in memory. The PTR record of DNS shows a canonical name of an IP address in a reverse DNS lookup.
9. The script does a third check (PTR simple check—first) which is about comparing the PTR CNAME against the data obtained from the Common Name (C=) value. The result for such match is a BOOLEAN value that will be stored in memory for later use.
10. The script does a fourth check (PTR simple check—second) which is about comparing the domain name/hostname against the data obtained from the Common Name (C=) value. The result for such match is a BOOLEAN value that will be stored in memory for later use.
11. The script does a fifth check (PTR check) using the data stored from step #4 which is inspected looking for any match for the PTR CNAME. The result for such match check is a BOOLEAN value that will be stored in memory for later use.
12. The script does a fifth check (CN check) using the data stored from step #4 which is inspected looking for any match for the domain name/hostname. The result for such match check is a BOOLEAN value that will be stored in memory for later use.
13. Finally, a successful match condition will be when:
    Step #9 OR Step #10 AND Step #11 AND Step #12 are TRUE
    Step #11 AND Step #12 are TRUE
    Step #12 is TRUE
14. A DB query is executed looking inside of the ip_name table for the name_id assigned to the organization extracted from the SSL certificate (O=) data, and then assigning the resulting organization name_id to the 3-tuple in the ip_identity table.

Example 6—Performing Name Identification Through Microsoft Global Catalog Over SSL For analyzing the identification of IP destinations of "Microsoft Global Catalog over SSL" protocol:
1. Run the script: ruby update_name_id_msft-gc-ssl.rb
2. The script performs a database (DB) query looking for all the IP addresses with name_id=0, ip_protocol=6 and ip_port=3269. The step will extract Microsoft Global Catalog over SSL records from the traffic log.
3. The script performs a first check using a 'openssl' linux command-line tool. The script takes as a target IP all the IP resulting addresses derived from the step #2 and starts the process for each one.
4. The 'openssl' linux command-line tool performs an SSL-connect action targeting TCP port 3269 (Microsoft Global Catalog over SSL) against the target IP address and store the result in memory for later use.
5. While setting up an SSL-connect with the IP destination, a certificate of the IP destination is received by the identification module. Usually, the certificate is issued to an organization by a certificate authority after the identification of the organization is verified. Therefore, in a case in which the owner of the certificate is the owner of the IP address, the organization name included in the certificate will accurately identify the owner of the IP destination.
6. The script parses out the Organizational Unit (O=) and Common Name (CN=) and stores both data in memory.
7. The script executes a DB query looking for the data contained inside of the "O=" field in the ip_name table as shown in FIG. 6. If it is already exists, then no new record for such organization will be inserted in the DB, otherwise it is inserted in the ip_name table as a new organization. Although the organization name of a certificate may be an accurate identification of an IP destination, in one embodiment it is desirable to perform a further check to verify the identification by the following optional steps.
8. The script does a second check by performing a PTR lookup on the target IP address using the linux 'dig' tool in order to get the corresponding linked domain(s) and such data is stored in memory. The PTR record of DNS shows a canonical name of an IP address in a reverse DNS lookup.
9. The script does a third check (PTR simple check—first) which is about comparing the PTR CNAME against the data obtained from the Common Name (C=) value. The result for such match is a BOOLEAN value that will be stored in memory for later use.
10. The script does a fourth check (PTR simple check—second) which is about comparing the domain name/hostname against the data obtained from the Common Name (C=) value. The result for such match is a BOOLEAN value that will be stored in memory for later use.
11. The script does a fifth check (PTR check) using the data stored from step #4 which is inspected looking for any match for the PTR CNAME. The result for such match check is a BOOLEAN value that will be stored in memory for later use.
12. The script does a fifth check (CN check) using the data stored from step #4 which is inspected looking for any match for the domain name/hostname. The result for such match check is a BOOLEAN value that will be stored in memory for later use.
13. Finally, a successful match condition will be when:
    Step #9 OR Step #10 AND Step #11 AND Step #12 are TRUE
    Step #11 AND Step #12 are TRUE
    Step #12 is TRUE
14. A DB query is executed looking inside of the ip_name table for the name_id assigned to the organization extracted from the SSL certificate (O=) data, and then assigning the resulting organization name_id to the 3-tuple in the ip_identity table.

Example 7—Performing Name Identification Through NNTPS

For analyzing the identification of IP destinations of "NNTPS" protocol:
1. Run the script: ruby update_name_id_nntps.rb
2. The script performs a database (DB) query looking for all the IP addresses with name_id=0, ip_protocol=6 and ip_port=563. The step will extract NNTPS records from the traffic log.
3. The script performs a first check using a 'openssl' linux command-line tool. The script takes as a target IP all the IP resulting addresses derived from the step #2 and starts the process for each one.

4. The 'openssl' linux command-line tool performs an SSL-connect action targeting TCP port 563 (NNTPS) against the target IP address and store the result in memory for later use.
5. While setting up an SSL-connect with the IP destination, a certificate of the IP destination is received by the identification module. Usually, the certificate is issued to an organization by a certificate authority after the identification of the organization is verified. Therefore, in a case in which the owner of the certificate is the owner of the IP address, the organization name included in the certificate will accurately identify the owner of the IP destination.
6. The script parses out the Organizational Unit (O=) and Common Name (CN=) and stores both data in memory.
7. The script executes a DB query looking for the data contained inside of the "O=" field in the ip_name table as shown in FIG. 6. If it is already exists, then no new record for such organization will be inserted in the DB, otherwise it is inserted in the ip_name table as a new organization. Although the organization name of a certificate may be an accurate identification of an IP destination, in one embodiment it is desirable to perform a further check to verify the identification by the following optional steps.
8. The script does a second check by performing a PTR lookup on the target IP address using the linux 'dig' tool in order to get the corresponding linked domain(s) and such data is stored in memory. The PTR record of DNS shows a canonical name of an IP address in a reverse DNS lookup.
9. The script does a third check (PTR simple check—first) which is about comparing the PTR CNAME against the data obtained from the Common Name (C=) value. The result for such match is a BOOLEAN value that will be stored in memory for later use.
10. The script does a fourth check (PTR simple check—second) which is about comparing the domain name/hostname against the data obtained from the Common Name (C=) value. The result for such match is a BOOLEAN value that will be stored in memory for later use.
11. The script does a fifth check (PTR check) using the data stored from step #4 which is inspected looking for any match for the PTR CNAME. The result for such match check is a BOOLEAN value that will be stored in memory for later use.
12. The script does a fifth check (CN check) using the data stored from step #4 which is inspected looking for any match for the domain name/hostname. The result for such match check is a BOOLEAN value that will be stored in memory for later use.
13. Finally, a successful match condition will be when:
    Step #9 OR Step #10 AND Step #11 AND Step #12 are TRUE
    Step #11 AND Step #12 are TRUE
    Step #12 is TRUE
14. A DB query is executed looking inside of the ip_name table for the name_id assigned to the organization extracted from the SSL certificate (O=) data, and then assigning the resulting organization name_id to the 3-tuple in the ip_identity table.

Example 8—Performing Name Identification Through POP3S

For analyzing the identification of IP destinations of "POP3S" protocol:

1. Run the script: ruby update_name_id_pop3s.rb
2. The script performs a database (DB) query looking for all the IP addresses with name_id=0, ip_protocol=6 and ip_port=995. The step will extract POP3S records from the traffic log.
3. The script performs a first check using a 'openssl' linux command-line tool. The script takes as a target IP all the IP resulting addresses derived from the step #2 and starts the process for each one.
4. The 'openssl' linux command-line tool performs an SSL-connect action targeting TCP port 995 (POP3S) against the target IP address and store the result in memory for later use.
5. While setting up an SSL-connect with the IP destination, a certificate of the IP destination is received by the identification module. Usually, the certificate is issued to an organization by a certificate authority after the identification of the organization is verified. Therefore, in a case in which the owner of the certificate is the owner of the IP address, the organization name included in the certificate will accurately identify the owner of the IP destination.
6. The script parses out the Organizational Unit (O=) and Common Name (CN=) and stores both data in memory.
7. The script executes a DB query looking for the data contained inside of the "O=" field in the ip_name table as shown in FIG. 6. If it is already exists, then no new record for such organization will be inserted in the DB, otherwise it is inserted in the ip_name table as a new organization. Although the organization name of a certificate may be an accurate identification of an IP destination, in one embodiment it is desirable to perform a further check to verify the identification by the following optional steps.
8. The script does a second check by performing a PTR lookup on the target IP address using the linux 'dig' tool in order to get the corresponding linked domain(s) and such data is stored in memory. The PTR record of DNS shows a canonical name of an IP address in a reverse DNS lookup.
9. The script does a third check (PTR simple check—first) which is about comparing the PTR CNAME against the data obtained from the Common Name (C=) value. The result for such match is a BOOLEAN value that will be stored in memory for later use.
10. The script does a fourth check (PTR simple check—second) which is about comparing the domain name/hostname against the data obtained from the Common Name (C=) value. The result for such match is a BOOLEAN value that will be stored in memory for later use.
11. The script does a fifth check (PTR check) using the data stored from step #4 which is inspected looking for any match for the PTR CNAME. The result for such match check is a BOOLEAN value that will be stored in memory for later use.
12. The script does a fifth check (CN check) using the data stored from step #4 which is inspected looking for any match for the domain name/hostname. The result for such match check is a BOOLEAN value that will be stored in memory for later use.
13. Finally, a successful match condition will be when:
    Step #9 OR Step #10 AND Step #11 AND Step #12 are TRUE
    Step #11 AND Step #12 are TRUE
    Step #12 is TRUE 14. A DB query is executed looking inside of the ip_name table for the name_id assigned to the organization extracted from the SSL certificate (O=) data, and then assigning the resulting organization name_id to the 3-tuple in the ip_identity table.

Example 9—Performing Name Identification Through SMTPS

For analyzing the identification of IP destinations of "SMTPS" protocol:
1. Run the script: ruby update_name_id_smtps.rb
2. The script performs a database (DB) query looking for all the IP addresses with name_id=0, ip_protocol=6 and ip_port=465. The step will extract SMTPS records from the traffic log.
3. The script performs a first check using a 'openssl' linux command-line tool. The script takes as a target IP all the IP resulting addresses derived from the step #2 and starts the process for each one.
4. The 'openssl' linux command-line tool performs an SSL-connect action targeting TCP port 465 (SMTPS) against the target IP address and store the result in memory for later use.
5. While setting up an SSL-connect with the IP destination, a certificate of the IP destination is received by the identification module. Usually, the certificate is issued to an organization by a certificate authority after the identification of the organization is verified. Therefore, in a case in which the owner of the certificate is the owner of the IP address, the organization name included in the certificate will accurately identify the owner of the IP destination.
6. The script parses out the Organizational Unit (O=) and Common Name (CN=) and stores both data in memory.
7. The script executes a DB query looking for the data contained inside of the "O=" field in the ip_name table as shown in FIG. 6. If it is already exists, then no new record for such organization will be inserted in the DB, otherwise it is inserted in the ip_name table as a new organization. Although the organization name of a certificate may be an accurate identification of an IP destination, in one embodiment it is desirable to perform a further check to verify the identification by the following optional steps.
8. The script does a second check by performing a PTR lookup on the target IP address using the linux 'dig' tool in order to get the corresponding linked domain(s) and such data is stored in memory. The PTR record of DNS shows a canonical name of an IP address in a reverse DNS lookup.
9. The script does a third check (PTR simple check—first) which is about comparing the PTR CNAME against the data obtained from the Common Name (C=) value. The result for such match is a BOOLEAN value that will be stored in memory for later use.
10. The script does a fourth check (PTR simple check—second) which is about comparing the domain name/hostname against the data obtained from the Common Name (C=) value. The result for such match is a BOOLEAN value that will be stored in memory for later use.
11. The script does a fifth check (PTR check) using the data stored from step #4 which is inspected looking for any match for the PTR CNAME. The result for such match check is a BOOLEAN value that will be stored in memory for later use.
12. The script does a fifth check (CN check) using the data stored from step #4 which is inspected looking for any match for the domain name/hostname. The result for such match check is a BOOLEAN value that will be stored in memory for later use.
13. Finally, a successful match condition will be when:
    Step #9 OR Step #10 AND Step #11 AND Step #12 are TRUE
    Step #11 AND Step #12 are TRUE
    Step #12 is TRUE
14. A DB query is executed looking inside of the ip_name table for the name_id assigned to the organization extracted from the SSL certificate (O=) data, and then assigning the resulting organization name_id to the 3-tuple in the ip_identity table.

In a further embodiment, the name identification is obtained by performing PTR and DNS (NS, MX) queries. The identification module 410 may comprise one or more Ruby scripts for analyzing the PTR NS and MX records to identify the owner of an IP destination.

Example 9—Performing Name Identification by Performing PTR and DNS (NS, MX) Queries 1. Run the script: ruby process_unverified.rb
2. The script performs a DB query looking for all the IP addresses with a 'last update' record no longer than 2 days.
3. The script performs a reverse-lookup on the target address using the 'dig' tool in order to extract the resulting host/domain data.
4. The script performs a DNS MX and DNS NS query using the 'dig' tool in order to extract the Mailer-Exchange and Name-Server records for the target IP address. The Mailer-Exchange record contains a mail exchange associated with the IP address and the Name-Server record contains an authoritative name server associated with the IP address.
5. Once the data is collected and formatted, the record of the owner of the IP in the DB is inserted/updated.

Figure 5:
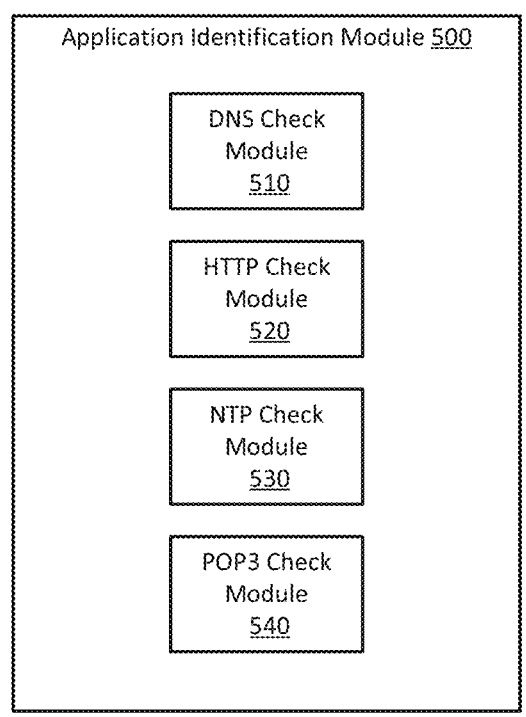
FIG. 5 is a block diagram conceptually illustrating an application identification module in accordance with an embodiment of the present invention.

FIG. 5 is a block diagram conceptually illustrating an application identification module 500 in accordance with an embodiment of the present invention. In the context of the current example, application identification module 500 may include a DNS check module 510, HTTP check module 520, a Network Time Protocol (NTP) check module 530 and a Post Office Protocol 3 (POP3) check module 540. Generally, an application associated with a network flow may be determined by the well-known ports. For more traditional protocols (e.g., DNS, NTP, POP3, etc.), the well-known ports give a starting point as to what traffic is expected. The well-known ports and associated services may be found at "Service Name and Transport Protocol Port Number Registry" which is maintained by the Internet Assigned Numbers Authority (IRNA). Application identification module 500 may identify an application/service name of a network flow by checking the protocol and port numbers of the network flow. However, it may be desirable to validate the application/service name determined by protocol and port numbers to ensure the traffic is as it is expected to be.

DNS Check module 510 is used for confirming from a remote source whether a host that is identified as a DNS server based on the protocol/port numbers is in fact a DNS server. In one embodiment, DNS Check module 510 includes 8 sub-modules. Each sub-module performs a specific task that facilitates the DNS identification process. According to one embodiment, the sub-modules and their details are as follows:

1. DNS Status—This sub-module may use the Linux tool "dig" to perform specific DNS queries on a target IP address through different protocols (TCP/UDP) on a DNS server.
2. Nslookup—This sub-module may use the Linux "nslookup" tool in order to get a fingerprint of a response received from a DNS server running on a target IP address.
3. Company—This sub-module may use the Linux "Nmap" port-scanner as backend and perform an identification of the company name or vendor that wrote the DNS server as well as the use of the external Linux tool "whois" which is used to extract organization information of the netblock owner in where the target IP address falls in.
4. Extract Version—This sub-module may use the Linux "Nmap" port-scanner as backend and does a DNS service scan looking for the DNS version that is running on the DNS server.
5. IP2Country—This sub-module may use GeoIP ruby gem or similar localization service to get country data for a target IP address.
6. Traceroute—This sub-module may use the Linux "traceroute" as backend and do a traceroute on a target IP address. The last 3 "hops" may be saved by this sub-module.
7. IP2OS—This sub-module may use the Linux "Nmap" port-scanner as backend and do Operating System identification on a target IP address.
8. Blacklist—This sub-module may use the public service of Malware domain list in order to identify malicious hosts on DNS responses received by a DNS server that is running on a target IP address.

DNS Check module 510 may get an overall "trustiness" of an identified DNS server based on the results of the above 8 sub-modules. The overall "trustiness" may be done by a calculation on the weights based on the given results generated by each sub-module. In one embodiment, DNS check module 510 may determine the overall "trustiness" of a DNS server by performing the following steps:

1. The sub-modules run against an IP address of a DNS server and store all the collected data in a table on a database. This step can be known like a "fingerprint" since this process stores the data that is going to be compared in consecutive days.
2. After a pre-determined time (e.g., 1, 2 or n days later), the sub-modules run against the same IP address and perform such checks again. If a sub-module fails, the sub-module will tag the DNS server as "FAIL", which means that the previous status (PASSED) was changed, and by this reason the sub-module is giving a failing status.
3. All the data can be stored within two tables. One table is used for storing the first or the most recent fingerprint data (the data that is going to be used for later comparison) and the other table is used for storing the data that is collected in consecutive runs.
4. After the sub-module run several times, DNS check module 510 may summarize how many have a FAILED/PASSED state and then perform a quick calculation based on each module weight and as result, it provides a "FULL TRUST" or "NOT TRUSTED" status for the target IP address.

HTTP Check module 520 may be used to confirm from a remote source whether an HTTP server is in fact an HTTP server. HTTP Check module 520 uses the Linux "Nmap" as backend for the information gathering activities. For instance, according to one embodiment, the HTTP checking process may be as follows:

1. An HTTP script of HTTP Check module 520 runs against an IP address.
2. The HTTP script calls Nmap, which is executed on an array of common ports. All ports running an HTTP or HTTPS service are remembered, and if the port listed with a database entry is not present in either container, the listing is invalid.
3. If the port from the entry is in either container, then an HTTP ping is sent to the IP/port. This is done to double check the port.
4. Nmap returns all ports using an HTTP or HTTPS service, but the port may be filtered or blocking outside traffic. If the HTTP ping succeeds then the entry is valid, else it is invalid.

Further, an application of a network flow cannot be precisely determined only by its 3-tuple in some scenarios. Therefore, it may be necessary that packets of a network flow be inspected in order to determine the application of the network flow. For example, a whois lookup of 3-tuple (157.166.226.45, TCP, 80) shows it is owned by "Turner Broadcasting System, Inc.". The specific site within TCP:80 cannot be easily determined at this stage. Packets associated with this network flow may then be inspected to determine that the traffic is indeed HTTP and the URL was www.cnn.com. Since the URL is also owned by Turner Broadcasting System, the name "Turner Broadcasting System" may be mapped uniquely to this 3-tuple.

Another example is 3-tuple (50.63.56.46, TCP, 80). A whois lookup shows that it is owned by "GoDaddy", which is a hosting service. The specific site within TCP:80 is not easily knowable at this stage. Most hosting companies map hundreds of URLs to a single IP address. Packets of the network flow may be inspected to find the application. In this case, the traffic is indeed a HTTP flow and the URL is www.greatjoomla.com. The IP address "50.63.56.46" is determined to be used by Go Daddy as a virtual hosting IP and the name of this IP address is assigned to GoDaddy.

The analyzing application based on 3-tuple is useful where the 3-tuple uniquely corresponds to a host and an application. When multiple applications are on the same port, it is impossible to determine the precise application from simply looking at the 3-tuple. This is mainly for protocols that can carry multiple applications on a single 3-tuple (mainly HTTP—Web2.0). In this case, a minimal amount of payload traffic is inspected to identify the application. For example, 3-tuple (74.125.224.146.TCP,80) is identified as Google Inc. There are multiple Google applications running inside TCP:80 (mail.google.com, maps.google.com, www.google.com, etc). The network flow analyzing system may store the beginning of a session. If the data in the session is encrypted, it can be sent to a full IPS engine for decryption and then used for identification of the application. In one embodiment, the network flow analyzing system may store and inspect at most 256 bytes of the session. These 256 bytes may be split between client and server traffic (e.g., in 32 byte chunks). For example, if only client traffic is needed, then all 256 bytes are collected from the client traffic. In another case, some data from the client traffic and some from the server traffic may be collected. In one embodiment, 128 bytes are collected from each of the client and server traffic.

Below is an example for Google Maps traffic:

0000 47 45 54 20 2f 6d 61 70 73 3f 68 6c 3d 65 6e 26 GET/maps?hl=en&
0010 74 61 62 3d 77 6c 20 48 54 54 50 2f 31 2e 31 0d tab=wl HTTP/1.1.
0020 0a 48 6f 73 74 3a 20 6d 61 70 73 2e 67 6f 6f 67 .Host: maps.goog
0030 6c 65 2e 63 6f 6d 0d 0a 55 73 65 72 2d 41 67 65 le.com..User-Age
0040 6e 74 3a 20 4d 6f 7a 69 6c 6c 61 2f 35 2e 30 20 nt: Mozilla/5.0

GET/maps?hl=en&tab=wl HTTP/1.1
Host: maps.google.com
User-Agent: Mozilla/5.0 (Windows NT 6.1; rv:15.0) Gecko/20100101
Firefox/15.0.1
Accept: text/html,application/xhtml+xml,application/xml;q=0.9, */*;q=0.8
Accept-Language: en-us,en;q=0.5
Accept-Encoding: gzip, deflate
Connection: keep-alive
Referer: http://74.125.224.146/

Looking at the first 80 bytes from the client, the session starts with a "GET" keyword, which is confirmation that the network flow is the HTTP protocol. It can also be seen that the host of the GET request is maps.google.com. Application identification module 510 may determine that this session is used for Google Maps and this network flow may be identified as Google Maps. The final result is 74.125.224.140, TCP,80-->Google Inc., HTTP—Google Maps NTP check module 530 is used for identifying a NTP network flow based on 3-tuple of the network flow and verifying if the IP destination is actually providing NTP service. POP3 check module 540 is used for identifying a POP3 network flow and verifying if the IP destination is actually providing POP3 service. NTP check module 530 and POP3 check module 540 may verify a NTP server or a POP3 server by checking the responses from the servers. If the responses are in conformity with NTP or POP3 protocols, then the corresponding servers are tagged as trusted. It is also possible to inspect packets of a network flow to determine or verify its application/service. It is to be understood that other services/applications of hosts may be identified and verified in the same way as described above. More modules for checking and verifying other services/applications may be incorporated into application identification module 500.

In other embodiments, the administrators or network security devices of different network sources may assign owners and applications to network flows and then upload the initial analyses to the network flow analyzing system. After the network flow analyzing system collects enough samples of a network flow from initial analyses, attributes of the network flow may be determined according to the samples from different network sources. In one embodiment, if a number of initial analyses from different network sources, that is over a pre-determined threshold, assign an owner and an application to a 3-tuple, then the network flow analyzing system may assign that owner and application to the 3-tuple. In another embodiment, if a number of initial analyses from different network sources, that is over a pre-determined percentage, assign a 3-tuple to an owner and an application, then the network flow analyzing system may assign that owner and application to the 3-tuple.

In a further embodiment, when a number of reports from different users show that a 3-tuple corresponds to a number of applications, several rules may be used to filter the raw data and deduce the correct identification. For example, 98% of users of a time (such as last 24 hours or last 2 weeks) report that 3-tuple (8.8.8.8 UDP 53) is DNS 98%, but the rest assign this 3-tuple to a set of seemingly random applications. To eliminate the false positive or weak signals, thresholds, such as percent of total, percentage of average and percentage of standard deviation, may be used. One example is shown in Table 1.

TABLE 1

| app_id | count | % of total | % of average | % of stdv |
|---|---|---|---|---|
| 1 | 12496 | 52.77% | 949.90% | 416.04% |
| 2 | 9 | 0.04% | 0.68% | 0.30% |
| 3 | 4 | 0.02% | 0.30% | 0.13% |
| 4 | 1 | 0.00% | 0.08% | 0.03% |
| 5 | 2 | 0.01% | 0.15% | 0.07% |
| 6 | 3 | 0.01% | 0.23% | 0.10% |
| 7 | 2 | 0.01% | 0.15% | 0.07% |
| 8 | 1925 | 8.13% | 146.33% | 64.09% |
| 9 | 1 | 0.00% | 0.08% | 0.03% |
| 10 | 16 | 0.07% | 1.22% | 0.53% |
| 11 | 5068 | 21.40% | 385.25% | 168.73% |
| 12 | 222 | 0.94% | 16.88% | 7.39% |
| 13 | 1 | 0.00% | 0.08% | 0.03% |
| 14 | 254 | 1.07% | 19.31% | 8.46% |
| 15 | 379 | 1.60% | 28.81% | 12.62% |
| 16 | 1 | 0.00% | 0.08% | 0.03% |
| 17 | 574 | 2.42% | 43.63% | 19.11% |
| 18 | 2721 | 11.49% | 206.84% | 90.59% |
|  | 23679 | 100.000% | 1315.500 | 3003.532 |

In TABLE 1, 3-tuple (xxx.xx.xx.x TCP 80) was reported 23679 times in a predetermined period and 18 applications are assigned to the 3-tuple by the users. Then, the distribution of the 18 applications are calculated. If the threshold for percent of total is set to 5% and used for filtering, then applications with app_id 1, 8, 11 and 18 are kept and the app_ids and this 3 tuple is assigned to these 4 applications. If the threshold for percent of average is set to 5% and used for filtering, then applications with app_id 1, 8, 11, 12, 14, 15, 17 and 18 are kept and the app_ids and this 3 tuple is assigned to these 8 applications. If the threshold for percent of standard deviation is set to 5% and used for filtering, then applications with app_id 1, 8, 11, 12, 14, 15, 17 and 18 are kept and the app_ids and this 3 tuple is assigned to these 8 applications.

Returning briefly to FIG. 3, distributing module 330 is used for distributing analysis reports to subscribers of network flow analysis service. The network flow analyzing system may periodically distribute one or more of the following reports:

Top 1000 tuples by total sessions
Top 1000 tuples by total bytes
Top 200 sessions for 3 tuple last 1 day
Top 200 sessions for 3 tuple last 30 days
Top 200 bytes for 3 tuple last 1 day
Top 200 bytes for 3 tuple last 30 days
Top 200 bytes for 3 tuple last 1 day The reports or attributes of network flows may be accessed by any subscriber as long as proper security credentials are presented. Distribution may be provided via interfaces such as RESTful API for automated interface and WebUI for manual interface. Other mechanism, such as email subscription and FTP download may also be used for distribution of the reports of network flow analyzing.

Figure 7:
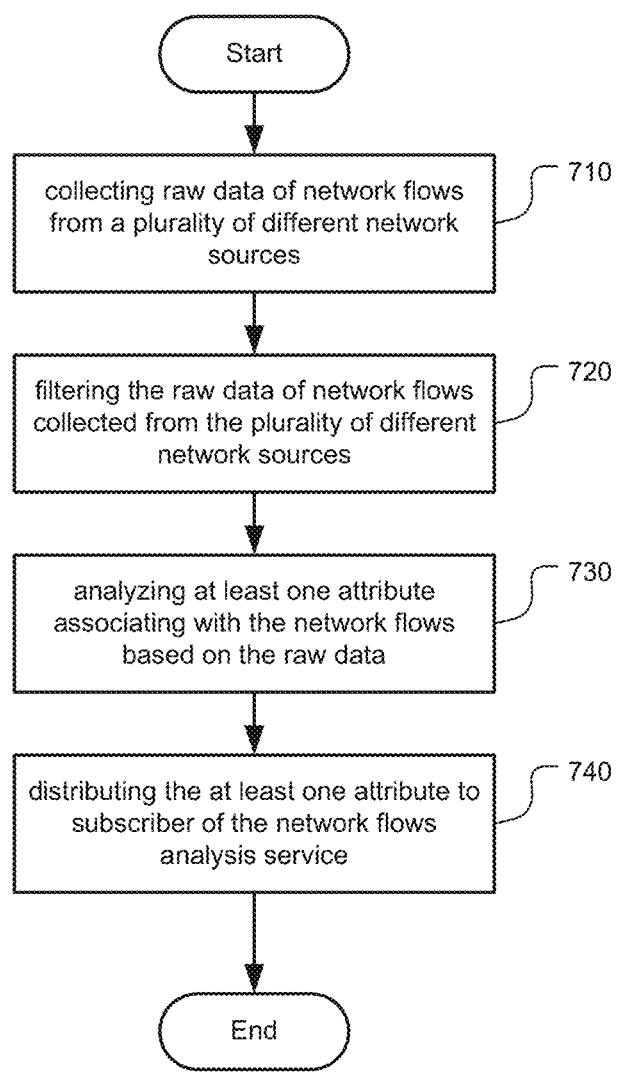
FIG. 7 is a flow diagram illustrating network flow analysis processing in accordance with an embodiment of the present invention.

FIG. 7 is a flow diagram illustrating network flow analysis processing in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 710, a network flow analyzing system collects network traffic information of network flows from different network sources. In one embodiment, network traffic information may be uploaded by network security devices of different network sources. In another embodiment, the network flow analyzing system may access one or more cloud-based traffic logs to collect network traffic information of different network sources. Network traffic information may be traffic logs of different network sources and may comprise different information associating with network traffic, such as IP destinations, IP protocols and IP ports. Network traffic information may also contain some portions or all data packets. The network flow analyzing system may also collect initial analyzing reports of network flows uploaded by different network sources.

At block 720, the network flow analyzing system filters the network traffic information of network flows collected from the plurality of different network sources. As network traffic information may contain different information and may in different format, the network traffic information is filtered to extract useful information for analyzing attributes of network flows. Further, local network traffic and source information included in the traffic logs may be filtered in order to simplify and anonymize the traffic logs.

At block 730, the network flow analyzing system analyzes attributes associated with the network flows based on the network traffic information. It is to be understood that the attributes of network flows may include owners of IP destinations, applications of the network flows, IP categories of network flows, web categories of network flows and the like. Each attribute of the network flows may be determined based on 3-tuple of the network flows. If attributes of network flows cannot be determined based on the 3-tuple, some portions of payloads of network flows may be inspected to precisely determine the attributes. Further, one or more scripts may be used for analyzing each of the attributes. An application assigned to a network flow may be further verified that the IP destination is indeed providing the assigned application. The attributes of network flows may also be re-checked periodically to update or amend the assigned attributes.

At block 740, the network flow analyzing system distributes analysis reports including the attributes of network flows to subscribers of the analysis service. Distribution may be provided via interfaces such as RESTful API or WebUI. Other mechanism, such as email subscription and FTP download may also be used for distribution of the reports of network flow analyzing.

Figure 8:
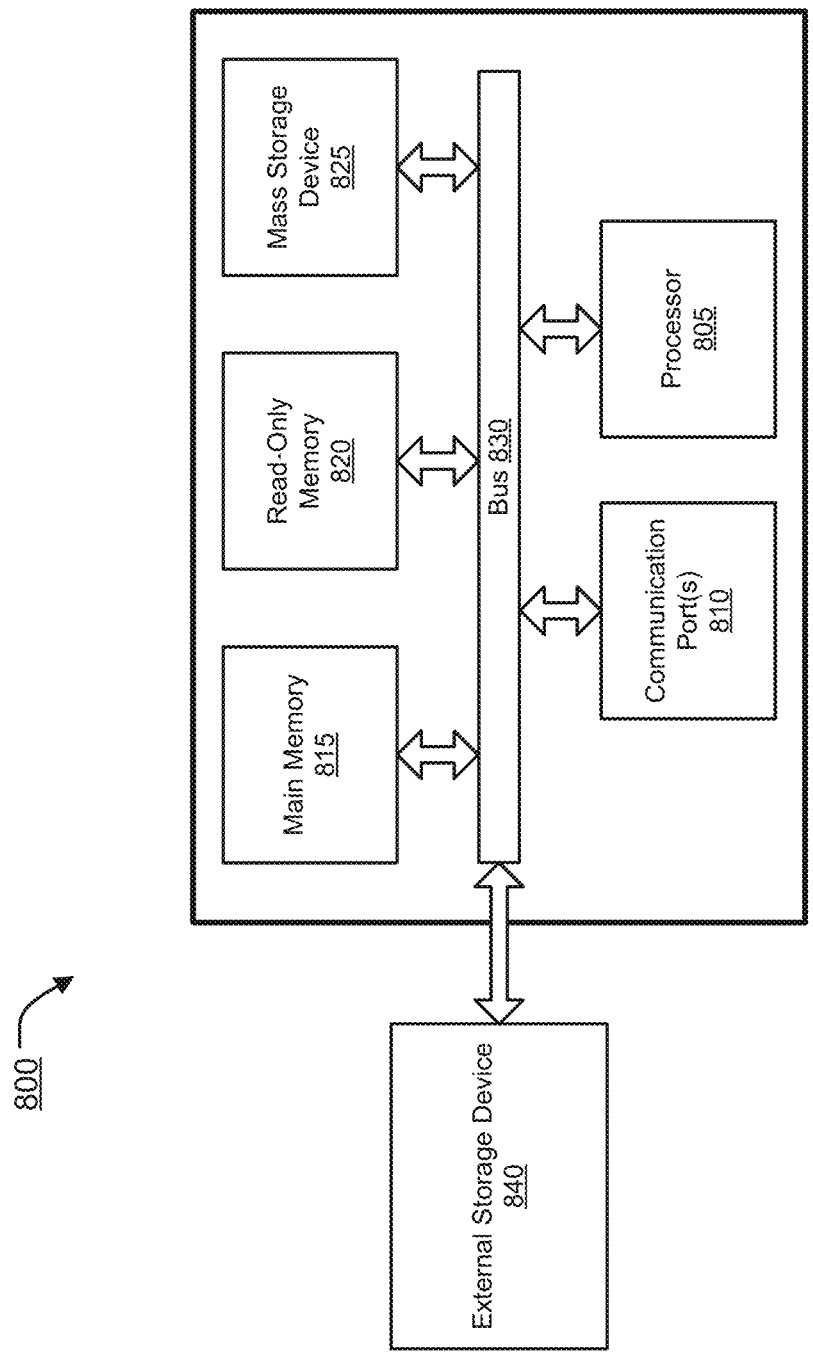
FIG. 8 is an exemplary computer system in which or with which embodiments of the present invention may be utilized.

FIG. 8 is an example of a computer system 800 with which embodiments of the present disclosure may be utilized. Computer system 800 may represent or form a part of a network appliance, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 800 includes a bus 830, a processor 805, communication port 810, a main memory 815, a removable storage media 840, a read only memory 820 and a mass storage 825. A person skilled in the art will appreciate that computer system 800 may include more than one processor and communication ports.

Examples of processor 805 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 805 may include various modules associated with monitoring unit as described in FIGS. 1-5.

Communication port 810 can be any of an RS-232 port for use with a modem based dialup connection, a 10/100 Ethernet port, a Gigabit or 10 Gigabit port using copper or fiber, a serial port, a parallel port, or other existing or future ports. Communication port 810 may be chosen depending on a network, such a Local Area Network (LAN), Wide Area Network (WAN), or any network to which computer system 800 connects.

Memory 815 can be Random Access Memory (RAM), or any other dynamic storage device commonly known in the art. Read only memory 820 can be any static storage device(s) such as, but not limited to, a Programmable Read Only Memory (PROM) chips for storing static information such as start-up or BIOS instructions for processor 805.

Mass storage 825 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 830 communicatively couples processor(s) 805 with the other memory, storage and communication blocks. Bus 830 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 805 to system memory.

Optionally, operator and administrative interfaces, such as a display, keyboard, and a cursor control device, may also be coupled to bus 830 to support direct operator interaction with computer system 800. Other operator and administrative interfaces can be provided through network connections connected through communication port 810.

Removable storage media 840 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method for providing network flow analysis services comprising:
    collecting, by one or more computer systems associated with a network flow analysis service provider, network traffic information associated with network flows from a plurality of different network sources;
    analyzing, by the one or more computer systems, at least one attribute associated with the network flows based on the network traffic information, wherein said analyzing comprises analyzing owners of a plurality of Internet Protocol (IP) destinations associated with the network flows, including, for each IP destination of the plurality of IP destinations:
        establishing, by the network flow analysis service provider, a security connection with the IP destination;
        receiving, by the network flow analysis service provider, via the security connection a certificate from the IP destination;
        extracting an organization name and a common name from the certificate;
        retrieving a canonical name (CNAME) associated with the IP destination;
        generating a first test result representing whether the common name and the CNAME match;
        issuing, by the network flow analysis service provider, a client connection request to the IP destination;
        receiving, by the network flow analysis service provider, a response from the IP destination to the client connection request;
        generating a second test result representing whether the CNAME is contained within a header or body of the response;
        generating a third test result representing whether the common name is contained within the header or body of the response;
        assigning the organization name of the certificate as the owner of the IP destination when the first test result, the second test result and the third test result are affirmative; and
    distributing, by the one or more computer systems, the at least one attribute to subscribers of a network flow analysis service provided by the network flow analysis service provider.

2. The method of claim 1, further comprising collecting initial flow analyses of the network traffic information from the plurality of different network sources.

3. The method of claim 2, wherein said initial analyses are classified by a network security device based on a set of rules of the network security device.

4. The method of claim 2, wherein said analyzing at least one attribute associated with the network flows based on the network traffic information comprises associating the at least one attribute with a network flow if a plurality of the initial analyses confirm the at least one attribute is associated with the network flow.

5. The method of claim 1, wherein said collecting network traffic information of network flows from a plurality of different network sources comprises collecting network traffic information from a network security device.

6. The method of claim 1, wherein said collecting network traffic information associated with network flows from a plurality of different network sources comprises collecting network traffic information from a cloud-based traffic log.

7. The method of claim 1, further comprising filtering the network traffic information collected from the plurality of different network sources before performing said analyzing.

8. The method of claim 7, wherein said filtering comprises filtering network traffic information associated with local network flows.

9. The method of claim 8, wherein said filtering comprises filtering source information of the network traffic information to anonymize the network flows.

10. The method of claim 8, wherein said filtering comprises keeping only IP destinations, IP protocols and IP ports of the network flows for analyzing.

11. The method of claim 1, further comprising selecting a more specific entity as an owner of an IP destination if more than one entity is associated with the IP destination.

12. The method of claim 1, further comprising inspecting a Uniform Resource Locator (URL) associated with an IP destination to determine an owner of the IP destination.

13. The method of claim 1, further comprising:
    determining if the owner of the IP destination is assigned with a netblock; and
    adding the owner of the IP destination and the assigned netblock to a local database.

14. The method of claim 13, further comprising:
    determining if the IP destination falls into the netblock in the local database; and
    assigning the owner of the IP destination to the owner of the netblock if the IP destination falls within the netblock.

15. The method of claim 1, further comprising:
    extracting a mail exchange and an authoritative name server associated with the IP destination; and
    assigning the mail exchange and the authoritative name server as the owner of the IP destination.

16. The method of claim 1, wherein said analyzing at least one attribute associated with the network flows based on the network traffic information comprises analyzing applications associated with the network flows.

17. The method of claim 16, further comprising determining an application of a network flow based on an IP protocol and an IP port of the network flow.

18. The method of claim 16, further comprising verifying if the IP destinations actually provide the applications.

19. The method of claim 18, further comprising repeating the verifying and comparing results of the verifying to determine whether the IP destination actually provides the application.

20. The method of claim 1, wherein said analyzing at least one attribute associated with the network flows based on the network traffic information comprises inspecting payload information within the network flows to determine the at least one attribute associated with the network flows.

21. A network flow analysis system comprising:
    non-transitory storage device having tangibly embodied therein instructions representing a network flow analysis application; and one or more processors coupled to the non-transitory storage device and operable to execute the network flow analysis application to perform a method comprising:
  collecting network traffic information associated with network flows from a plurality of different network sources;
  analyzing at least one attribute associated with the network flows based on the network traffic information, wherein said analyzing comprises analyzing owners of a plurality of Internet Protocol (IP) destinations associated with the network flows, including, for each IP destination of the plurality of IP destinations:
    establishing a security connection with the IP destination;
    receiving via the security connection a certificate from the IP destination;
    extracting an organization name and a common name from the certificate;
    retrieving a canonical name (CNAME) associated with the IP destination;
    generating a first test result representing whether the common name and the CNAME match;
    issuing a client connection request to the IP destination;
    receiving a response from the IP destination to the client connection request;
    generating a second test result representing whether the CNAME is contained within a header or body of the response;
    generating a third test result representing whether the common name is contained within the header or the body of the response;
    assigning the organization name of the certificate as the owner of the IP destination when the first test result, the second test result and the third test result are affirmative; and
  distributing the at least one attribute to subscribers of a network flow analysis service provided by the network flow analysis system.

22. The system of claim 21, wherein the method further comprises collecting initial flow analyses of the network traffic information from the plurality of different network sources.

23. The system of claim 22, wherein said initial analyses are classified by a network security device based on a set of rules of the network security device.

24. The system of claim 22, wherein said analyzing at least one attribute associated with the network flows based on the network traffic information comprises associating the at least one attribute with a network flow if a plurality of the initial analyses confirm the at least one attribute is associated with the network flow.

25. The system of claim 21, wherein said collecting network traffic information of network flows from a plurality of different network sources comprises collecting network traffic information from a network security device.

26. The system of claim 21, wherein said collecting network traffic information associated with network flows from a plurality of different network sources comprises collecting network traffic information from a cloud-based traffic log.

27. The system of claim 21, wherein the method further comprises filtering the network traffic information collected from the plurality of different network sources before performing said analyzing.

28. The system of claim 27, wherein said filtering comprises filtering network traffic information associated with local network flows.

29. The system of claim 28, wherein said filtering comprises filtering source information of the network traffic information to anonymize the network flows.

30. The system of claim 29, wherein said filtering comprises keeping only IP destinations, IP protocols and IP ports of the network flows for analyzing.

31. The system of claim 21, wherein the method further comprises selecting a more specific entity as an owner of an IP destination if more than one entity is associated with the IP destination.

32. The system of claim 21, wherein the method further comprises inspecting a Uniform Resource Locator (URL) associated with an IP destination to determine an owner of the IP destination.

33. The system of claim 21, wherein the method further comprises:
  determining if the owner of the IP destination is assigned with a netblock; and
  adding the owner of the IP destination and the assigned netblock to a local database.

34. The system of claim 33, wherein the method further comprises:
  determining if the IP destination falls into the netblock in the local database; and
  assigning the owner of the IP destination to the owner of the netblock if the IP destination falls within the netblock.

35. The system of claim 21, wherein the method further comprises:
  extracting a mail exchange and an authoritative name server associated with the IP destination; and
  assigning the mail exchange and the authoritative name server as the owner of the IP destination.

36. The system of claim 21, wherein said analyzing at least one attribute associated with the network flows based on the network traffic information comprises analyzing applications associated with the network flows.

37. The system of claim 36, wherein the method further comprises determining an application of a network flow based on an IP protocol and an IP port of the network flow.

38. The system of claim 36, wherein the method further comprises verifying if the IP destinations actually provide the applications.

39. The system of claim 38, wherein the method further comprises repeating the verifying and comparing results of the verifying to determine whether the IP destination actually provides the application.

40. The system of claim 21, wherein said analyzing at least one attribute associated with the network flows based on the network traffic information comprises inspecting payload information within the network flows to determine the at least one attribute associated with the network flows.

* * * * *